June 18, 1946.    G. M. LUTES ET AL    2,402,171
HYDRAULIC SAFETY VALVE
Filed Sept. 2, 1943

INVENTORS
Theodore J. Landt and Gilbert M. Lutes
BY
*Herrstrom* and
*Thibodeau* ATTORNEYS Patented June 18, 1946

2,402,171

UNITED STATES PATENT OFFICE 2,402,171

HYDRAULIC SAFETY VALVE

Gilbert M. Lutes, Gilman, Iowa, and Theodore J. Landt, Minneapolis, Minn.

Application September 2, 1943, Serial No. 500,928

2 Claims. (Cl. 303—84)

(Granted under the act of March 3, 1883, as amended April 30, 1928; 370 O. G. 757)

The invention described herein may be manufactured and used by or for the Government for governmental purposes without the payment to us of any royalty thereon.

The present invention pertains to a novel safety valve designed primarily for the hydraulic braking system of a motor vehicle.

A typical hydraulic braking system includes a master cylinder and individual connections therefrom to the brakes. The brakes are applied by developing pressure in the master cylinder, and this pressure is communicated more or less uniformly to the brake actuating devices. A leak in one of the connections drains substantially the entire fluid supply and thereby renders all of the brakes inoperative.

The object of this invention is to provide a safety device which localizes the leakage to the broken connection in such a manner that the remaining connections are unaffected and the corresponding brakes remain operative. The device for accomplishing this operation is an appliance inserted in each of the connections and having a piston with a restricted movement therein. The piston is necessarily by-passed to permit operation despite minor leaks and to permit bleeding or emptying the system. When a leak occurs in a connection, on the discharge side of the piston, the reduced pressure permits the piston to move beyond its predetermined limits. The construction is such that, at this time, the piston closes the outlet from the by-pass and hence from the remainder of the system. The remaining connections and brakes are thus unaffected by the leak. The appliances are mounted close to the master cylinder so that a break between them and the master cylinder is not likely.

The various objects and features of invention will be fully understood from the following detailed description of preferred forms of the invention, throughout which description reference is made to the accompanying drawing in which.

Figure 1:
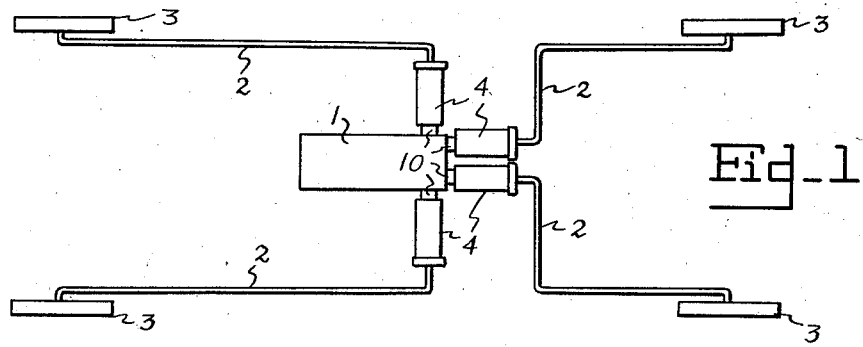
Figure 1 is a diagram of a hydraulic braking system according to the invention.

In Figure 1 is shown a hydraulic braking system for a vehicle including the usual master cylinder 1 and fluid lines 2 extending from the discharge side thereof to each of the brakes 3. Ordinarily, a leak in one of the lines 2 will deplete the system of its entire fluid supply, thereby subjecting the vehicle to great danger. The invention, as stated, includes a safety valve in each line to maintain in operating condition the lines that are not broken. In Figure 1 this device is represented by a cylinder 4 in each of the lines.

Figure 2:
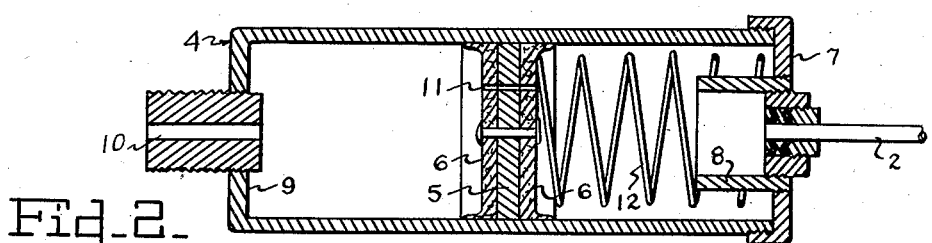
Figure 2 is a longitudinal section of the safety valve.

The valve is shown in detail in Figure 2. The cylinder 4 has mounted therein a piston 5 with suitable packing 6. To the end wall 7 attached to the line 2 is fastened a tube 8 coaxial with the cylinder. The attachment may be made in any suitable manner, as by threading the tube into the wall 7 as shown. At the opposite end wall 9 is a connection 10 to the master cylinder 1. This connection is very short, or the cylinder 4 may be connected directly into the master cylinder, so that a break between the master cylinder and any cylinder 4 is not likely to occur.

A by-pass aperture 11 is formed through the piston to maintain the lines filled with fluid in case of small leakage and to permit bleeding the lines when necessary. The distance of this aperture from the axis of the cylinder is such that the aperture will close against the end of the tube 8 when the piston is forced in that direction under conditions presently to be described. A light, coil spring 12 is mounted between the piston 6 and wall 7, to be compressed when braking pressure is applied and to restore the piston to its neutral position when the pressure is relieved.

In the neutral position of the piston, there is enough fluid in the front of it to operate the associated brake on a small movement of the piston initiated by increased pressure developed in the master cylinder in the usual manner. The piston should not travel into contact with the tube 8 in normal operation.

Figure 3:
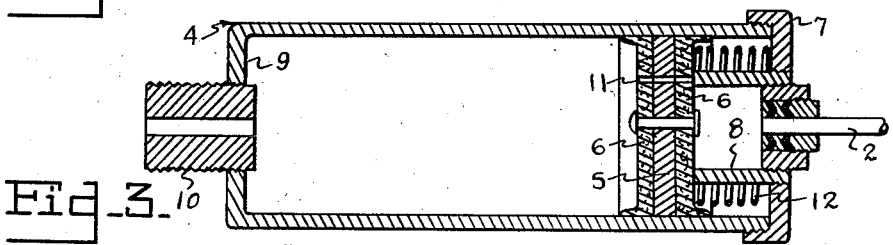
Figure 3 is a similar view of the valve in closed position.

In the event of leakage in the line 2, the reduced pressure on this side of the piston permits the higher pressure in the master cylinder to move the piston into contact with the tube 8. The port 11 closes against the end of the tube, as shown in Figure 3, and the line is therefore closed from the remainder of the system. Only the fluid in the line 2 and in the brake is lost. Although the associated brake is rendered inoperative, the remaining brakes are unaffected and provide a substantial, although incomplete, braking function.

Figure 4:
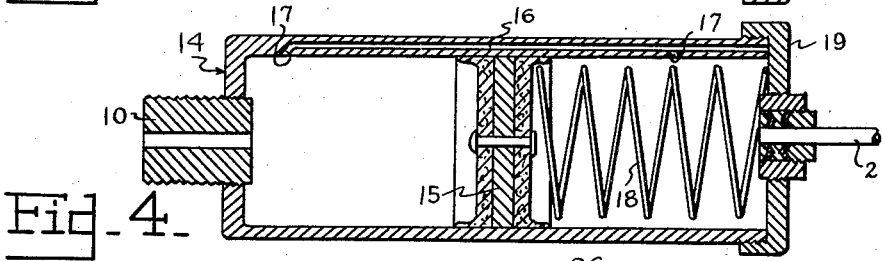
Figure 4 is a longitudinal section of a modified construction.

In the modification shown in Figure 4, the cylinder 14 contains a piston 15 without a by-pass aperture. The by-pass is provided as a longitudinal channel 16 in one of the walls of the cylinder. The ends 17 of the by-pass are spaced from the corresponding ends of the cylinder at such a distance as to be closed or passed by the piston when the latter is in an extreme position. Thus, in case of a leak, the piston is moved towards the line 2 and obstructs the line from the by-pass and the remainder of the system. A member corresponding to the tube 8 of Figure 2 is not necessary since the piston is not apertured for by-pass. A spring 18, corresponding to the spring 12 in Figure 2, is inserted between the piston 15 and the cylinder end 19 receiving the line 2.

Figure 5:
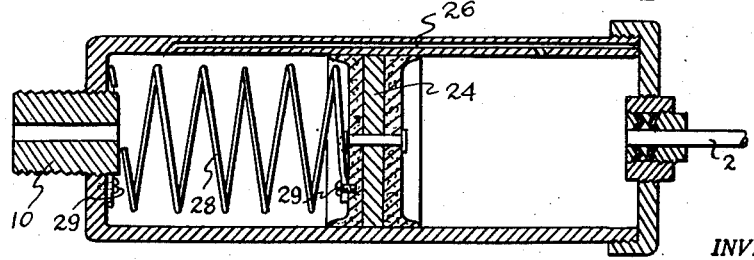
Figure 5 is a longitudinal section of a further modified construction adapted to close in either direction.

The modified construction shown in Figure 5 precludes the possibility of inserting the cylinder in the fluid system in a reversed position. It is designed to operate in either position. The cylinder 24 is formed with a by-pass 26 positioned in its wall as described in connection with Figure 4. The piston 25 in either extreme position closes the by-pass from the adjacent line 2 or 10. A spring 28 is inserted between the piston and either end wall and is fastened to the piston and the wall by suitable means such as screws 29. When positioned between the piston and the discharge end of the cylinder, the spring operates as described with reference to Figure 4. When positioned between the piston and the intake end of the cylinder, as shown, the spring is expanded by pressure in the master cylinder and line 10. When this pressure is relieved, the spring obviously retracts the piston to its neutral position.

The invention is also applicable to the braking system for the landing wheels of aircraft. A skillful pilot can make effective use of one brake when the other brake has lost its fluid.

Although preferred embodiments of the invention have been shown and described, it will be understood that variations and modifications of the details of construction may be made without departing from the scope of the invention as indicated by the appended claims.

What we claim is:

1. In a hydraulic braking system, a master operating device, a plurality of brakes, a fluid connection between said device and each of said brakes, and a reversible safety valve for each connection, each said reversible valve comprising a cylinder having a fluid opening at each end thereof, a piston slidably mounted in said cylinder dividing said cylinder into chambers on opposite sides of the piston, spring means normally urging said piston to a substantially central position in said cylinder, said cylinder having a by-pass in the wall thereof, the ends of said by-pass opening into said cylinder chambers to normally by-pass said pistons, each end of said by-pass being adjacent one end of said cylinder and positioned to be closed by said piston in its extreme position toward that end of the cylinder, whereby said safety valve may be assembled in either direction in said fluid connection and be effective to close said by-pass upon a failure in said fluid connection between the safety valve and the brake connected thereto to prevent leaking of fluid from the remainder of the hydraulic braking system through said failure.

2. In a hydraulic braking system, a master operating device, a plurality of brakes, a fluid connection between said device and each of said brakes, and a reversible safety valve for each connection, each said reversible valve comprising a cylinder having a fluid opening at each end thereof, a piston slidably mounted in said cylinder dividing said cylinder into chambers on opposite sides of the piston, a coil spring in said cylinder on one side of said piston and adapted to operate both in compression and in tension, said spring having one end connected to said piston and its opposite end connected to the end wall of said cylinder and arranged to normally urge said piston to a substantially central position in said cylinder, said cylinder having a by-pass in the wall thereof, the ends of said by-pass opening into said cylinder chambers to normally by-pass said piston, each end of said by-pass being adjacent one end of said cylinder and positioned to be closed by said piston in its extreme position toward that end of the cylinder, whereby said safety valve may be assembled in either direction in said fluid connection and be effective to close said by-pass upon a failure in said fluid connection between the safety valve and the brake connected thereto to prevent leaking of fluid from the remainder of the hydraulic braking system through said failure.

GILBERT M. LUTES.
THEODORE J. LANDT.